(12) United States Patent
Claudi et al.

(10) Patent No.: US 7,568,808 B2
(45) Date of Patent: Aug. 4, 2009

(54) OPTICAL OBSERVATION INSTRUMENT HAVING A DEVICE FOR PROTECTING AGAINST INCOMING FLARE

(75) Inventors: Volker Claudi, Lahnau (DE); Matthias Heller, Hohenahr (DE)

(73) Assignee: Hensoldt AG, Wetzlar (DE)

( * ) Notice: Subject to any disclaimer, the term of this patent is extended or adjusted under 35 U.S.C. 154(b) by 191 days.

(21) Appl. No.: 11/247,850

(22) Filed: Oct. 11, 2005

(65) Prior Publication Data

US 2006/0092518 A1 May 4, 2006

(30) Foreign Application Priority Data

Oct. 14, 2004 (DE) .................. 10 2004 050 165

(51) Int. Cl.
*G02B 27/00* (2006.01)

(52) U.S. Cl. ...................... 359/614; 359/834

(58) Field of Classification Search ............... 359/614, 359/834

See application file for complete search history.

(56) References Cited

U.S. PATENT DOCUMENTS

| | | | |
|---|---|---|---|
| 4,909,609 A | 3/1990 | McDowell | |
| 4,934,246 A | 6/1990 | Benson et al. | |
| 5,152,759 A * | 10/1992 | Parel et al. | 606/5 |
| 5,181,054 A * | 1/1993 | Nicolas et al. | 353/20 |
| 5,727,017 A * | 3/1998 | Maurer et al. | 374/9 |
| 5,867,329 A | 2/1999 | Justus et al. | |
| 6,075,661 A | 6/2000 | Gross et al. | |
| 6,945,657 B2 * | 9/2005 | Shirai et al. | 359/608 |
| 2004/0211900 A1 * | 10/2004 | Johnson | 250/338.5 |
| 2005/0036218 A1 * | 2/2005 | Lunt | 359/837 |

FOREIGN PATENT DOCUMENTS

| | | |
|---|---|---|
| DE | 101 51 701 A1 | 5/2002 |
| EP | 0 855 607 A2 | 7/1998 |
| FR | 2 844 602 | 3/2004 |

OTHER PUBLICATIONS

H. Tsuda et al.; "Polarisation independent tunable liquid-crystal Fabry-Perot Interferometer filter module with double-pass configuration"; May 1995; pp. 828-829.

* cited by examiner

*Primary Examiner*—Joshua L Pritchett
(74) *Attorney, Agent, or Firm*—Harness, Dickey & Pierce, P.L.C.

(57) ABSTRACT

An optical observation instrument has a device (1) for protecting against incoming flare (40) arranged within the beam path of the instrument. The device contains a filter (22/30) tuned to the flare (40). The filter (22/30) is configured and arranged within the beam path such that the flare (40) transits the filter (22/30) at least two times.

16 Claims, 1 Drawing Sheet

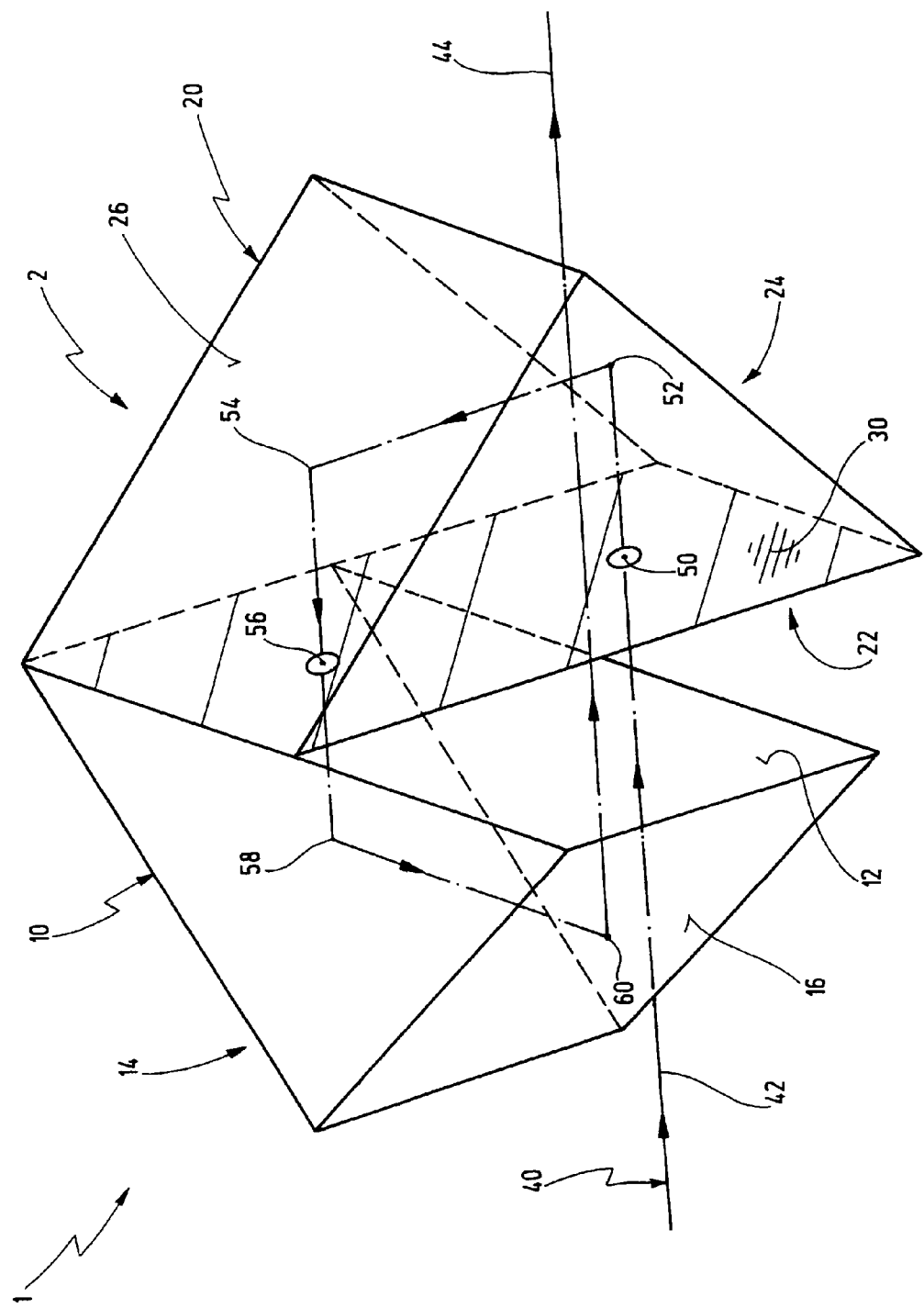

OPTICAL OBSERVATION INSTRUMENT HAVING A DEVICE FOR PROTECTING AGAINST INCOMING FLARE

FIELD OF THE INVENTION

The invention is related to the field of optical instruments.

More specifically, the invention is related to an optical observation instrument having a device for protecting against incoming flare arranged within the beam path of the instrument, the device comprising a filter tuned to the flare.

BACKGROUND OF THE INVENTION

Optical observation instruments are used under various circumstances in which there is a danger that a flare of high intensity enters into the observation instrument in addition to the proper observation light. Such flare may endanger or damage the eyes of a user of the observation instrument and likewise endanger or damage an observation sensor element.

In the military field it is well known to provide visual observation instruments, i.e. telescopes, periscopes, night vision instruments, video cameras and the like with a device for protecting the observer against flare. This holds true in particular for laser radiation of high intensity as emitted in combat situations by enemy laser weapons but also by range finders or aiming devices. Conventionally, Nd-YAG solid state lasers having a wave length of about 1.0 μm, i.e. above the visible range of between 400 and 800 nm, are used for that purpose.

In this context U.S. Pat. No. 6,075,661 discloses an adapter that may be applied in front of a lens of an optical instrument, for example a night vision goggle. The adapter comprises an interference filter tuned to the laser light wave length.

U.S. Pat. No. 4,934,246 discloses a periscope for a tank vehicle. The periscope is provided with a window made from tempered glass and acting as a laser filter.

U.S. Pat. No. 4,909,609 describes a protection device for telescopes and the like utilizing a nonlinear optical element for protecting the observer against laser radiation of high intensity.

Further prior art devices utilize mechanical or electrooptical apertures or shutters.

Similar problems likewise arise in the civil sector. For example, in the field of ophthalmology laser light is used for diagnostic and therapeutic, in particular surgical purposes, with an optical observation taking place simultaneously. On the other hand, laser light is also used for various industrial manufacturing applications, for example for the production of semiconductor components, for marking spectacle lenses and the like. In this context Excimer lasers are conventionally used having a wavelength depending on the particular design and being 350 nmm (XeF), 248 nm (KrF) or 193 nm (ArF), i.e. below the visible range.

Under a more general aspect, the invention is also related to flare protection devices of other kind, for example on rear mirrors in motor vehicles.

The invention is particularly related to visual observation instruments but not limited to that field.

In an optical observation instrument of the type specified at the outset, i.e. a telescope for military applications, it is known in the art to apply a laser protection coating on a lens arranged within the beam path. In that case, the filter layer acts as an interference filter having a spectrally selective transmission behaviour. The flare transits the interference filter one time.

The disadvantage of this prior art device lies in the fact that it is impossible to manufacture filter layers having an ideally homogenous transmission distribution over the surface thereof. On the other hand, for a sufficient protection, the flare transmission should be of the order of $10^{-5}$. This can, however, only be achieved if the sum of the unavoidable defective spots within a filter layer as manufactured under real conditions, is correspondingly small. With an effective diameter of 10 mm, the defective spot surface fraction may not exceed 0.003 $mm^2$. Such a low surface fraction, however, can only be achieved, if at all possible, when extreme cleanliness requirements are fulfilled during the production of the filter layer or when extreme scrap ratios are accepted.

Interference filters, moreover, have the disadvantage that due to the highly exact parallelism between the input and the output surfaces, on which the flare impinges under right angles, multiple reflections may occur between these surfaces. One can show that the optical density and, hence, the protective effect of the filter decreases with the number of the multiple reflections.

It is, therefore, an object underlying the invention to improve an optical observation instrument of the type specified at the outset such that the afore-mentioned disadvantages are avoided. In particular, an observation instrument shall be provided that has a high protective effect against flare while the flare filter may be manufactured at reasonable costs.

SUMMARY OF THE INVENTION

In an observation instrument of the type specified at the outset, this object is achieved in that the filter is configured and arranged within the beam path such that the flare transits the filter at least two times.

The object underlying the invention is thus entirely solved.

The trick to let the flare transit the filter layer two times results in a substantial reduction of the requirements to the cleanliness of the filter layer production process because the maximum permissible defective spot surface fraction increases highly superproportionally. For the above given example with a protective effect of $10^{-5}$ and an effective diameter of 10 mm the permissible defective spot surface fraction increases from those 0.003 $mm^2$ as mentioned above for an interference filter, to 0.4 mm for an embodiment of the invention, i.e. by a factor 130.

In an embodiment of the invention, the filter comprises a filter layer.

This measure has the advantage that the filtering function may be put into practice in a simple way being known as such.

In further elaborated versions of this embodiment, the filter layer is a layer for selectively absorbing or for selectively reflecting the flare.

This measure has the advantage that for each individual application the optimum material may be used for the filter layer.

A particularly good effect is achieved when the flare is essentially not reflected on its way between the first and the second transit through the filter.

This measure has the advantage that the above mentioned highly superproportional increase of the permissible defective spot surface fraction may be achieved because the optical density would decrease with the number of multiple reflections.

Moreover, a good effect is achieved, when the flare on its way from the first to the second transit through the filter is guided through a material being optically selectively absorbing for the flare. For example, for a flare from a Nd-YAG-Laser the material is selected from the group: LLF3, LLF4, GFK68, Sk12.

This measure has the advantage that multiple reflections between the transits are further reduced or attenuated.

In a particularly preferred embodiment of the invention, the filter is located in the area of a boundary surface between two individual prisms of a prism assembly.

This measure has the advantage that the desired twofold transit of the flare may be achieved with simple and compact optical means.

In this context it is particularly preferred when the prism assembly is a Porro prism.

This measure has the advantage that the design is particularly compact.

Although all kinds of flare are addressed within the scope of the present invention, the filter, in a preferred application, is tuned to the flare of a laser, in particular is tuned to the flare of a Nd-YAG laser (military applications) or is tuned to the flare of an Excimer laser (civil applications).

Within the scope of the present invention, the observation instrument as such is preferably a telescope, an ophthalmological diagnostic or therapeutic instrument or an instrument as used in the production of semiconductor components.

Further advantages of the invention will become apparent from the description and the enclosed drawing.

It goes without saying that the features mentioned before and those that will be explained hereinafter may not only be used in the particularly given combination but also in other combinations or alone without leaving the scope of the present invention.

BRIEF DESCRIPTION OF THE DRAWINGS

An embodiment of the invention is shown in the drawing and will be explained in further detail within the subsequent description.

The only FIGURE, in a perspective and schematic view, shows a Porro prism system as may be used within the scope of the present invention.

DETAILED DESCRIPTION OF THE PREFERRED EMBODIMENTS

In the FIGURE, reference numeral 1 designates a device within an optical observation instrument being intended for protecting against incoming flare. The optical observation instrument, preferably, is a visual observation instrument as, for example, a telescope, a periscope, a night vision instrument or the like. Device 1 serves for protecting the eyes of a user. If the observation instrument uses a sensor element for observing, i.e. in a video camera, for example, then device 1 protects the sensor element.

Device 1 comprises a Porro prism 2. Porro prism 2, as known per se, consists of two individual prisms. A first individual prism 10 has a hypotenuse surface 12, a first cathetus surface 14, and a second cathetus surface 16. A second individual prism 20 has a hypotenuse surface 22, a first cathetus surface 24, and a second cathetus surface 26. Individual prisms 10 and 20 adjoin each other with approximately one half of their hypotenuse surfaces 12 and 22.

A filter layer or coating 30 is applied to hypotenuse surface 22 of second individual prism 20. Filter layer 30, depending on the particular application, preferably has a high pass or a low pass characteristic. If device 1 shall effect a protection against laser light having a wave length below the range of visible light (Excimer laser for civil, medical and industrial applications), then a high pass characteristic is selected. If, however, device 1 is intended to provide protection against laser light having a wave length above the range of visible light (Nd-YAG laser for military applications), then a low pass characteristic is selected. As an alternative, one may also select a narrow band stop characteristic for the particular wave length range.

Reference numeral 40 indicates a flare, for example the afore-mentioned laser radiation. Flare 40 enters device 1 at 42 and exits at 44.

Porro prism 2 is positioned within device 1 such that flare 40 from its entering at 42 on runs through below first individual prism 10 and then runs through hypotenuse surface 22 of second individual prism 20 for entering same through a first transit 50. Flare 40 is then reflected at a first reflection point 52 on first cathetus surface 24 of second individual prism 20, is then one more time reflected at a second reflection point 54 on second cathetus surface 26 of second individual prism 20, and then transits via a second transit 56 on hypotenuse surface 22 into first individual prism 10. Flare 40 is there reflected at a third reflection point 58 on first cathetus surface 14 of first individual prism 10 and is then again reflected at a fourth reflection point 60 on second cathetus surface 16 of first individual prism 10. Flare 40 then exits again from Porro prism 2 through hypotenuse surface 12 of first individual prism 10, passing laterally by second individual prism 20.

Accordingly, flare 40 has transited hypotenuse surface 22 of second individual prism 20 two times and, thereby, also filter layer 30 at transits 50 and 56.

The above explained increase in permissible defect spot surface fraction materializes the more, the less reflections occur between transits 50 and 56. In an interference filter having exactly parallel boundary surfaces, substantial inner reflections occur. One can show that this results in a decrease of optical density and, therefore, in a decrease of protection effect.

With real Porro prism 2, in contrast, reflecting surfaces 24-26-14-16 are not ideally conjugated because their angular orientation is subject to deviations. Therefore, multiple reflections are not imaged in themselves but are aborted after a relatively small number of reflections.

The protective effect of device 1 may be further improved by making the path between transits 50 and 56 from a material being selectively optically absorbing for flare 40. If protection against laser radiation from a Nd-YAG laser is sought, then LLF33, LLF4, GFK68 or SK12 could be used as such material.

The invention claimed is:

1. An optical observation instrument having a device for protecting against incoming flare having a wavelength, said device being arranged within a beam path of said instrument having an input directed to a source of said flare and having an output directed to an observation means, said device comprising a narrowband filter tuned to the wavelength of said flare for selectively absorbing said flare, wherein said filter is configured and arranged within said beam path such that said flare transits said filter at least two times on its way between said input and said output, said device comprising a prism provided with a filter layer on a first surface thereof, said flare entering said device through said filter layer provided on said first surface and being reflected within said prism on a second surface and on a third surface of said prism and then exiting from said prism towards said output through said filter layer provided on said first surface, and further wherein the flare entering said device transits said filter layer at a first transit and transits said filter layer when exiting from said prism toward said output at a second transit distant from said first transit.

2. The optical observation instrument of claim 1, wherein said flare on its way from the first to the second transit through said filter is guided through a material being optically selectively absorbing for said flare.

3. The optical observation instrument of claim 1, wherein said filter is located in an area of a boundary surface between two individual prisms of a prism assembly.

4. The optical observation instrument of claim 3, wherein said prism assembly is a Porro prism.

5. The optical observation instrument of claim 1, wherein said filter is tuned to a flare of a laser.

6. The optical observation instrument of claim 5, wherein said filter is tuned to a flare of a Nd-YAG laser.

7. The optical observation instrument of claim 6, wherein for a flare from a Nd-YAG-Laser said material is selected from a group: LLF3, LLF4, GFK68, Sk12.

8. The optical observation instrument of claim 5, wherein said filter is tuned to a flare of an Excimer laser.

9. The optical observation instrument of claim 1, wherein said instrument is a telescope.

10. The optical observation instrument of claim 1, wherein said instrument is an opthalmological diagnostic or therapeutic instrument.

11. The optical observation instrument of claim 1, wherein said instrument is an instrument as used in a production of semiconductor components.

12. An optical observation instrument having a device for protecting against incoming flare having a wavelength, said device being arranged within a beam path of said instrument having an input directed to a source of said flare and having an output directed to an observation means, said device comprising a narrowband filter tuned to the wavelength of said flare for selectively absorbing said flare, wherein said filter is configured and arranged within said beam path such that said flare transits said filter at least two times on its way between said input and said output, said device comprising a prism provided with a filter layer on a first surface thereof, said flare entering said device through said filter layer provided on said first surface and being reflected within said prism on a second surface and on a third surface of said prism and then exiting from said prism towards said output through said filter layer provided on said first surface; wherein said flare is essentially not reflected back towards said input on its way between the first and the second transit through said filter.

13. The optical observation instrument of claim 12, wherein said flare on its way from the first to the second transit through said filter is guided through a material being optically selectively absorbing for said flare.

14. The optical observation instrument of claim 12, wherein said filter is located in an area of a boundary surface between two individual prisms of a prism assembly.

15. The optical observation instrument of claim 12, wherein said filter is tuned to a flare of a laser.

16. The optical observation instrument of claim 12, wherein the flare entering said device transits said filter layer at a first transit and transits said filter layer when exiting from said prism toward said output at a second transit distant from said first transit.

* * * * *